United States Patent
Bradski

(10) Patent No.: US 6,654,483 B1
(45) Date of Patent: Nov. 25, 2003

(54) MOTION DETECTION USING NORMAL OPTICAL FLOW

(75) Inventor: Gary R. Bradski, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/470,115

(22) Filed: Dec. 22, 1999

(51) Int. Cl.⁷ ................................................. G06K 9/00
(52) U.S. Cl. ..................... 382/107; 348/169; 348/415.1; 348/699
(58) Field of Search ................................. 382/103, 107; 348/169–172, 143–160, 415.1, 699

(56) References Cited

U.S. PATENT DOCUMENTS

| | | | |
|---|---|---|---|
| 4,937,878 A | * 6/1990 | Lo et al. | 382/103 |
| 5,148,477 A | 9/1992 | Neely et al. | 382/6 |
| 5,327,161 A | 7/1994 | Logan et al. | 345/157 |
| 5,343,390 A | 8/1994 | Doi et al. | 392/132 |
| 5,751,836 A | 5/1998 | Wildes et al. | 382/117 |
| 5,790,208 A | * 8/1998 | Kwak et al. | 348/415.1 |
| 5,798,787 A | * 8/1998 | Yamaguchi et al. | 348/152 |
| 5,801,704 A | 9/1998 | Oohara et al. | 345/358 |
| 5,802,220 A | 9/1998 | Black et al. | 382/276 |
| 5,805,165 A | 9/1998 | Thorne, III et al. | 345/348 |
| 5,805,733 A | 9/1998 | Wang et al. | 382/232 |
| 5,847,755 A | * 12/1998 | Wixson et al. | 348/149 |
| 5,923,776 A | 7/1999 | Kamgar-Parsi | 382/173 |
| 5,926,568 A | 7/1999 | Chaney et al. | 382/217 |
| 5,930,379 A | * 7/1999 | Rehg et al. | 345/473 |
| 5,936,610 A | 8/1999 | Endo | 345/157 |
| 6,009,210 A | 12/1999 | Kang | 382/276 |
| 6,028,960 A | 2/2000 | Graf et al. | 382/203 |
| 6,070,003 A | 5/2000 | Gove et al. | 710/132 |
| 6,097,839 A | 8/2000 | Liu | 382/181 |
| 6,111,517 A | 8/2000 | Atick et al. | 340/825.34 |
| 6,127,990 A | 10/2000 | Zwern | 345/8 |
| 6,130,707 A | * 10/2000 | Koller et al. | 340/511 |
| 6,192,078 B1 | * 2/2001 | Komiya et al. | 375/240.16 |
| 6,400,831 B2 | * 6/2002 | Lee et al. | 348/169 |
| 6,437,820 B1 | * 8/2002 | Josefsson | 348/169 |

* cited by examiner

Primary Examiner—Samir Ahmed
Assistant Examiner—Anand Bhatnagar
(74) Attorney, Agent, or Firm—Schwegman, Lundberg, Woessner & Kluth, P.A.

(57) ABSTRACT

A system and method allow for the detection, segmentation and analysis of regions of motion. The system and method use a motion history image generated by observing an object over a given period of time. The motion history image contains numerous regions captured at different time intervals. In one method, the most recent region(s) are located and adjacent older regions are labeled with a unique identifier to perform a down fill operation. Each down fill operation can identify a single motion contained in the motion history image. If a down filled region of the motion history image contains more than one movement, separate up fill operations can be performed to help separate the movements. Each up fill operation begins at a set of oldest or lowest value regions and progresses toward the most recent region. The down fill and up fill operations can be combined to provide an image mask(s) to separate the multiple motions from the motion history image.

12 Claims, 11 Drawing Sheets

MOTION DETECTION USING NORMAL OPTICAL FLOW

TECHNICAL FIELD OF THE INVENTION

The present invention relates generally to machine-human interface and in particular the present invention relates to motion detection.

BACKGROUND OF THE INVENTION

An increasing interest in the recognition of human motion and action using computer vision has appeared, with much emphasis on real-time computability. In particular, tracking/surveillance systems, human computer interfaces, and entertainment domains have a heightened interest in understanding and recognizing human movements. For example, monitoring applications may provide a signal only when a person is seen moving in a particular area (perhaps within a dangerous or secure area). Interface systems may be desired which understand gestures as a means of input or control, and entertainment applications may want to analyze the actions of the person to better aid in the immersion or reactivity of the experience.

In prior work, a real-time computer vision representation of human movement known as a Motion History Image (MHI) was presented. The MHI is a compact template representation of movement originally based on the layering of successive image motions. The recognition method presented for these motion templates used a global statistical moment feature vector constructed from image intensities, resulting in a token-based (label-based) matching scheme. Though this recognition method showed promising results using a large database of human movements, no method has yet been proposed to compute the raw motion information directly from the template without the necessity of labeling the entire motion pattern. Raw motion information may be favored for situations when a precisely labeled action is not possible or required. For example, a system may be designed to respond to leftward motion, but may not care if it was a person, hand, or car moving that generated the motion.

Further, detecting multiple motions in a motion history image can be difficult. That is, multiple motions in different directions can mask the individual motions.

For the reasons stated above, and for other reasons stated below which will become apparent to those skilled in the art upon reading and understanding the present specification, there is a need in the art for a system and method to detect multiple motions.

SUMMARY OF THE INVENTION

The above mentioned problems with detecting multiple motions and other problems are addressed by the present invention and will be understood by reading and studying the following specification.

In one embodiment, a method of detecting motion comprises obtaining a plurality of images of an object over a predetermined period of time, generating a motion region image of the object from the plurality of images, tracking regions of the motion region image from a current region to an older region, and identifying movement based on the tracking regions of the motion region image.

In another embodiment, a method of detecting motion comprises obtaining a plurality of images of an object using a camera. The plurality of images are obtained over a predetermined sliding window of time. A motion history image of the object from the plurality of images is generated by isolating (segmenting) the object in the plurality of images from the background. The object may be segmented from the background in many ways, including differences from a known background scene, frame by frame differences to catch object motion, or by detecting the color and/or texture of a known object against a background. Down fill operations are performed on the motion history image, wherein each down fill operation tracks regions of the motion history image from an area on the current region to an older region, and labels contents of each down fill region with a unique identifier. Up fill operation(s) may be performed within each down fill region of the motion history image, wherein the up fill operation goes from an older region to the current region, and labels contents of each up fill region with a unique identifier.

Movement is identified based on the down fill operation and possibly one or more up fill operations.

In another embodiment, a computer readable medium comprises instructions to instruct a processor to perform the method of: obtaining a plurality of images of an object over a predetermined period of time; generating a motion region image of the object from the plurality of images; tracking regions of the motion region image from a current region to an older region; and identifying movement based on the tracking regions of the motion region image.

BRIEF DESCRIPTION OF THE DRAWINGS

FIG. 1(*b*) illustrates a difference image based on the image of FIG. 1(*a*);

FIG. 1(*c*) illustrates a motion history image based on the image of FIG. 1(*a*);

FIG. 1(*d*) illustrates a motion region image based on the image of FIG. 1(*a*);

FIG. 6(*b*) illustrates motion gradients of FIG. 6(*a*);

DETAILED DESCRIPTION OF THE INVENTION

Figure 1A:
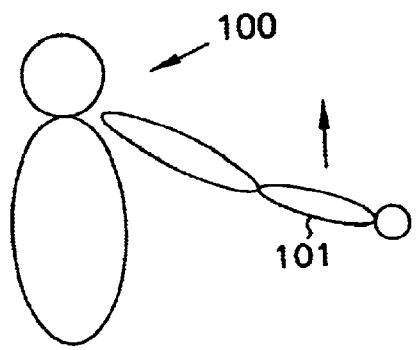
FIG. 1(*a*) illustrates an image of a foreground object.

In the following detailed description of the preferred embodiments, reference is made to the accompanying drawings that form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The present invention can be implemented using a computer system. The system can include a hard disk drive, magnetic disk drive, and/or an optical disk drive. The drives and their associated computer-readable media can provide nonvolatile storage of computer-readable instructions, data structures, program modules and other data for the computer. It should be appreciated by those skilled in the art that any type of computer-readable media (magnetic and optical discs) which can store data that is accessible by a computer, such as but not limited to magnetic cassettes, flash memory cards, random access memories (RAMs), read only memories (ROMs), and the like, may be used with the present invention.

As described in greater detail below, silhouettes of a moving person can be layered over time to form a Motion History Image (MHI) template. The idea is that the motion template itself implicitly encodes directional motion information along the layered silhouette contours. Motion orientations can then be extracted by convolving image gradient operators over the MHI. With the resulting motion field, various forms of motion analysis and recognition are possible.

Prior to describing the present invention, a description of pervious motion template work is provided. In previous work, a real-time computer vision approach for representing and recognizing simple human movements was provided. The motivation for the approach was based on how easily people can recognize common human movements (like sitting or push-ups) from low-resolution (blurred) imagery. Here, recognition results even though image features themselves are not perceivable, thus showing the role of motion for recognition. Accordingly, the method given relies on "patterns of motion" rather than on structural features for the representation for human motion. In that method, the space-time image volume containing the motion is collapsed into a single 2-D template, still perceptually capturing the essence of the movement and its temporal structure. The template is generated by layering successive image differences of a moving person, and is referred to as a Motion History Image (MHI).

For recognition of these templates, seven higher-order moments are initially extracted from the MHI and also from a binarized version of the MHI. These fourteen moments are used as global shape descriptors and temporal recency localizers for the MHI. The moments are then statistically matched to stored examples of different movements. This method of recognition has shown promising results using a large database of movements. But the main limitation is that characterization of the template is token (label) based (e.g. "crouching" or "sitting"), where it cannot yield much information other than recognition matches (i.e. it cannot determine that, say, a lot of "up" motion is currently happening).

The accumulation of object silhouettes in a motion template can yield useful motion information along the contours of a person, or object. The present invention uses a MHI representation and uses silhouettes instead of image differences as the basis for motion calculation. To acquire the silhouettes, several different methods can be used with the present invention. For example, full-body silhouettes of a person can be generated using a fast background subtracting method based on Red-Green-Blue (RGB) threshold differences. Then pixel erosion, dilation and region growing methods are applied to remove noise and extract the silhouette.

Other methods are applicable and may be desirable for more complex backgrounds, but this method was selected for simplicity and speed. One immediate limitation of using silhouettes is that no motion inside the region can be seen. For example, a silhouette generated from a camera facing a person would not show the hands moving in front of the body. One possibility to help overcome this problem is to simultaneously use multiple camera views. Another method is to further identify regions within the silhouette that share common texture or color characteristics.

The present invention provides systems and methods for detecting multiple motions using motion history images. The invention can segment the motion history images into meaningful multiple motions that may be obscured using other methods.

Prior to describing the present invention, a description is provided of U.S. patent application Ser. No. 09/384,462, filed Aug. 27, 1999 and having the title "MOTION DETECTION USING NORMAL OPTICAL FLOW. The following sections provide a detailed description for detecting normal optical flow from a motion history image, according to the above application. Normal optical flow identifies movement perpendicular to object boundaries. An approach for computing motion orientations from a silhouette-based motion template representation is provided. The method improves upon prior methods of approximation to optical flow in two areas: (1) eliminating spurious flow from boundary pixels, (2) using a faster metric to measure normal optical flow.

Figure 1B:
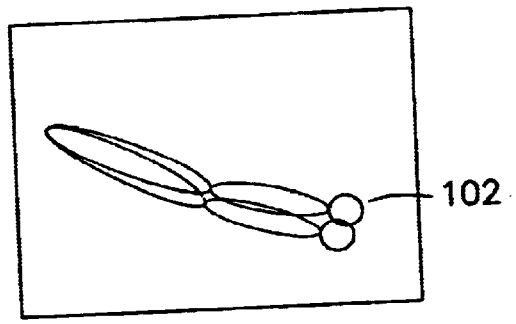

Pseudo Code is provided below for generating a suitable Motion History (MH) image for use with the present invention. To help explain the algorithms in the pseudo code, some definitions are first provided:

diffIm is an image created from frame, background differencing, selected image statistics, or other suitable method for isolating an object. An example is illustrated in FIG. 1(a) showing a person 100 and one arm 101. This image is referred to herein as the foreground image or object. When the foreground object moves, the movement from frame to frame may be recorded in an image such as shown in FIG. 1(b). This image illustrates the difference 102 between movements of the arm, and is referred to herein as a difference image.

Figure 1C:
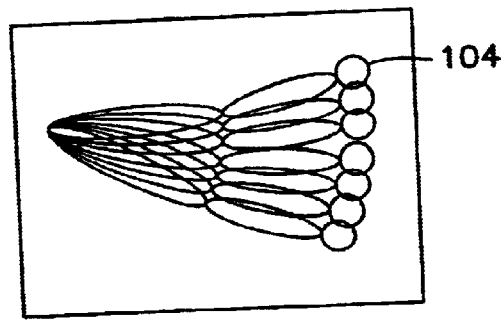

A Motion History (MH) image is illustrated in FIG. 1(c) showing the movement of a person's arm. Successive frame difference or background difference images are used to code the motion from FIG. 1(a) into the motion history image 104 in FIG. 1(c). When a new object silhouette image is available, all non-zero pixels in the MH image are decreased by one. Pixel values which are below a threshold, tau_min, are set to zero. The pixels from the most recent difference image are set to a high value, tau_max, in the MH image as shown in FIG. 1(c). Thus, the most recent motion as given by the most recent difference image has the highest value (tau_max) and older motion is coded by successively lower image values in the MH image. Time slices can come frame to frame, or from set periods of time, or be triggered by movement of the foreground object by more than a set threshold.

Figure 1D:
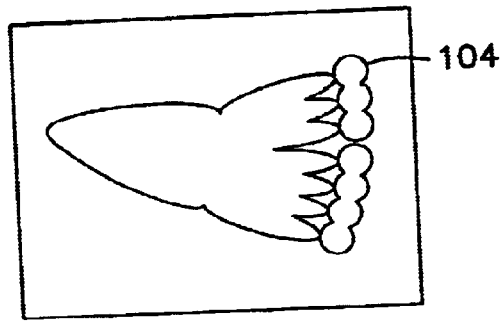

A Motion Region (MR) silhouette 106 is illustrated in FIG. 1(d). A MR image is created by setting all the non-zero pixels in the MH image to a maximal gray scale value. For example, the image from FIG. 1(c) is turned into an MR image illustrated in FIG. 1(d).

A GRAYimage is a one channel gray scale image in pixel or planar order. Pixels types can be selected from known 8U, 8S, or 32F formats.

$Tau_{13}$ max is an integer pixel value of most recent input. As stated, all older inputs are decreased by 1 in value.

$Tau_{13}$ min is an integer pixel that is a low threshold value. Any pixels equal to or below this value are set to zero ($Tau_{13}$ max>tau_min).

WinLen is an integer number of previous time slices that a user wants to use for recognition purposes.

The following is one example of pseudo code that can be used to provide MR images:

```
// To generate the MH (motion history) image from diffIm images:
// User note: The original MH image starts out as all zeroes.
void updateMH(GRAYimage& MH, GRAYimage& diffIm, int tau_max,
int tau_min)
{
int val;
// look over the image
for(int y=0;y<MH.getHeight();y++)
for(int x=0;x<MH.getWidth();x++)
    {
    // see if new motion
    if(diffIm.getPixel(x,y)!=0)
        {
        // set MH image
        MH.setPixel(x,y, tau_max);
        }
        else if( (val = (MH.getPixel(x,y)-1) ) > tau_min) // old motion
        {
        // decrease old values
        MH.setPixel(x,y, val);
        }
        else
        {
        // motion too old, set to zero
        MH.setPixel(x,y, 0);
        }
    }
}
// For gesture recognition, in order to compare the current MH image
// with stored models of gesture motion, we sometimes need to remove
// past time slices and then re-normalize the remaining slices for
// comparison.
//
// In this routine, we re-normalize the current motion back to "winLen"
// time slices. WinLen <= tau_max – tau_min.
// This routine is typically followed by Hu moment generation –
// re-normalization allows for more separable moment numbers.
void renormMH(GRAYimage& MH,
        GRAYimage& normedMH,
        int tau_max,
        int winLen)
{
int pix;
int val;
int cutoff=tau_max – winLen; // operate on values greater than this
for(int y=0;y<MH.getHeight();y++)
    for(int x=0;x<MH.getWidth();x++)
        {
        // put MH value in range of 0..255
        if( (val=MH.getPixel(x,y)) > cutoff)
        {
            // renormalized value
            pix = (1.0 + (float)(val–tau_max)/(float)winLen*255;
        }
        else
        {
            // wipe it out
            pix=0;
        }
        // save that value
        normedMH.setPixel(x,y, pix);
        }
}
// Implementation Note:
// In the above routine, the calculation is fairly slow, a better way of doing
it would be to // calculate a look-up table of 256 values before entering the
// for loops. For more rapid comparison when re-normalization isn't need
// to create separable values, thresholding is all that is required.
Void thresholdMH(GRAYimage & MH, GRAYimage & threshMH, int thresh)
{
        cvlThresholdToZero(MH,threshMH,thresh);
}
```

An alternate method of generating MH images that has the advantage of reducing the dependency on CPU speed or frame rate is described next. Pixels from the most recent DiffIm are written into the MH image with values representing the current time in a floating point representation. All pixels in the MH image whose time stamp values are older than current time minus tau_delta are set to zero. There is then no need for the renormMH and thresholdMH functions and the updateMH function becomes:

```
// Use timestamps to update Motion History Image
Void updateMH(GRAimage& MH, GRAYimage& diffIm, float
        current_time, float tau_delta)
{
float too_old = current_time – tau_delta;
//look over the image
for(int y=0; y<MH.getHeight(); y++)
    for(int x=0; x<MH.getWidth(); x++)
        {
        //see if new motion
        if(diffIm.getPixel(x,y) !=0)
            {
            //set MH image
            MH.setPixel(x,y,current_time);
            }
            else if(MH.getPixel(x,y) < too_old)
            {
            //zero out values too old
            MH.setPixel(x,y,0);
            }
        }
}
```

Figure 2:
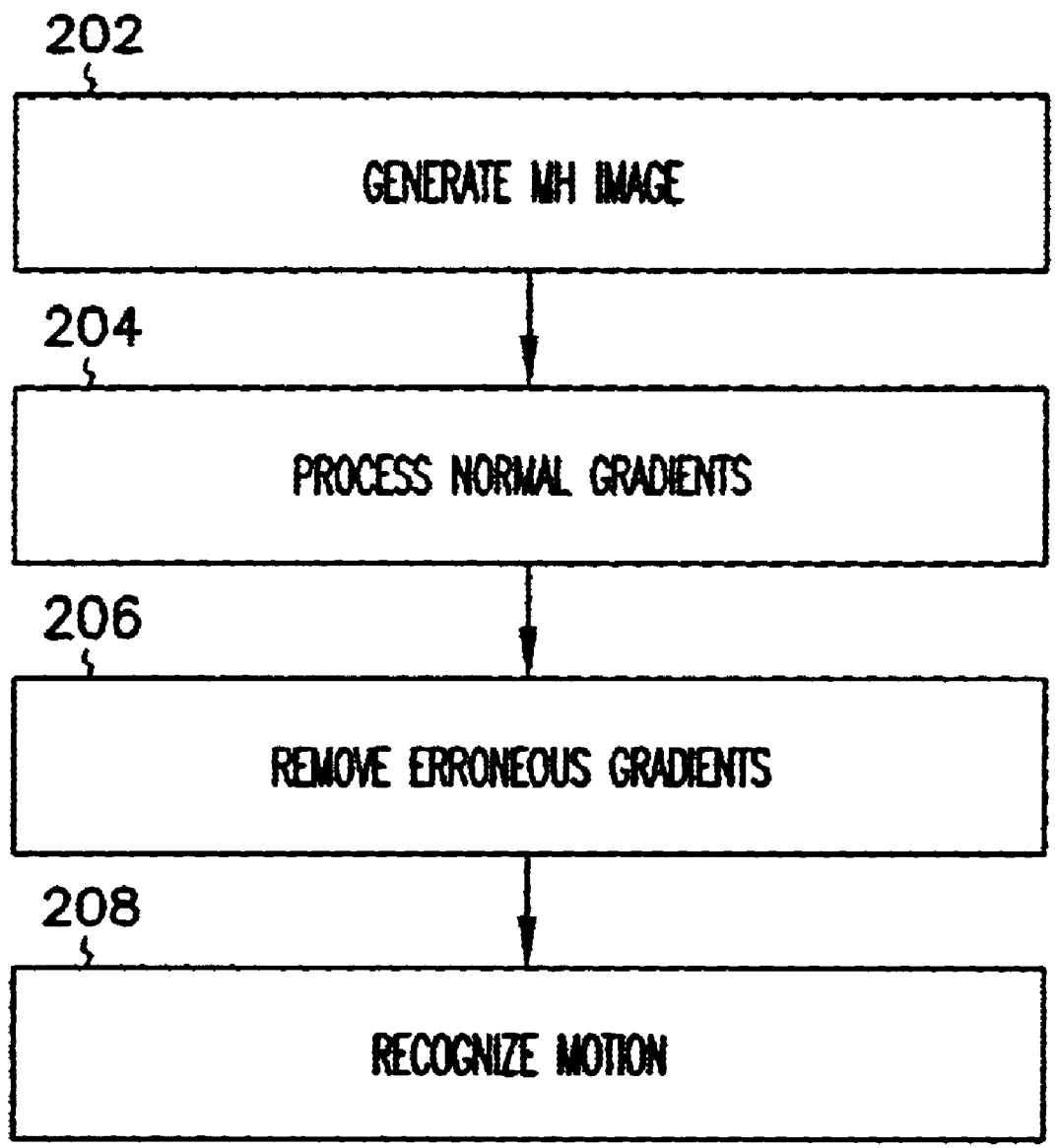
FIG. 2 is a flow chart of one embodiment of the present invention.

The above described methods are example ways of creating an MH image that can be used to detect motion, and other methods can also be used. FIG. 2 illustrates a simplified flow chart 200 of one method. The process includes a step 202 which generates a motion history image (MH), as explained above. The MH image is processed at step 204 to provide normal gradients of the image. Erroneous gradients are removed at step 206 using either a threshold analysis or an eroding technique. The remaining gradients are used to recognize motion at step 208.

In one embodiment step 204 is performed by applying an X and Y 3×3 Sobel operator to the silhouette pixels of the MH image. If the resulting response at a pixel location (x,y) is $S_x(x,y)$ to the X Sobel operator and $S_y(x,y)$ to the Y operator, then the orientation of the gradient is calculated as:

$$A(x,y)=\arctan(S_y(x,y)/S_x(x,y)), \quad (1)$$

and the magnitude of the gradient is:

$$M_{L2}(x,y)=\sqrt{S_x^2(x,y)+S_y^2(x,y)} \quad (2)$$

Equation (1) is applied to the MH image and identifies the direction, or angle, of the image flow. Equation (2) gives the "L2" magnitude of the vectors. Alternately, the operator applied to the MH image can be varied. Here equations (1) and (2) can be applied, but the two dimensional output is used:

$$S_x(x,y) \text{ and } S_y(x,y) \quad (3)$$

and the "L1" magnitude:

$$M_{L1}(x,y)=|S_x(x,y)|+|S_y(x,y)| \quad (4)$$

Figure 3:
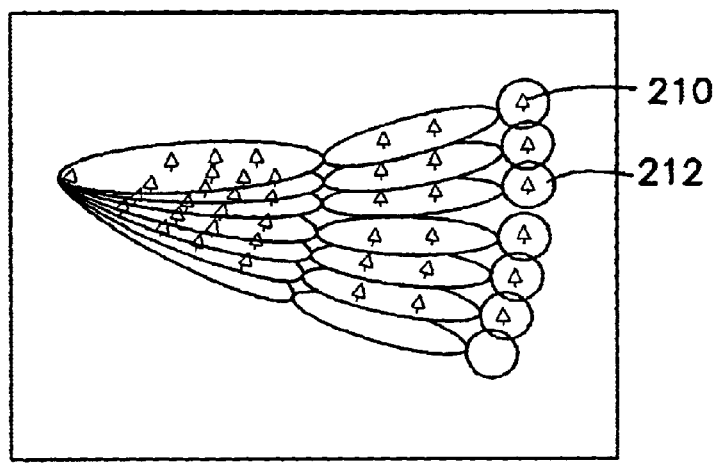
FIG. 3 illustrates normal gradients superimposed on a motion history image.

Applying the X and Y Sobel operator to the MH image gives information as to the angle and magnitude of optical flow (arrows 210) as shown here superimposed over the MH image, see FIG. 3. Equations (1) and (2) give these values directly, while equation (3) gives these values implicitly. It is noted that the boundary pixels 212 of the MH region can give incorrect motion angles and magnitudes. Interior holes in the MR region can also give incorrect flow around the boundaries of the hole. These erroneous pixels are removed at step 206, as explained below.

In one embodiment, a one dimensional histogram of equation (1) thresholded by equation (2) can be used to cut out the spurious boundary pixels. Alternatively, a two dimensional histogram of the outputs of equation (3) can be used to save computation by avoiding having to calculate the arctangent for each active pixel. As such, thresholding can also use the much faster L1 magnitude in equation (4).

Figure 4:
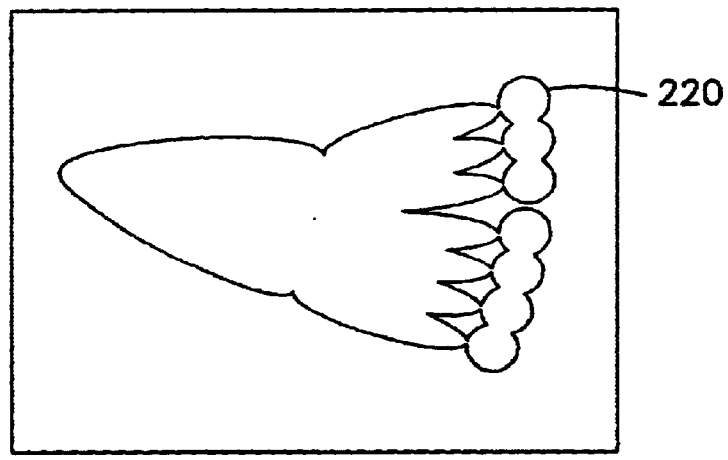
FIG. 4 illustrate a boundary mask.
Figure 5:
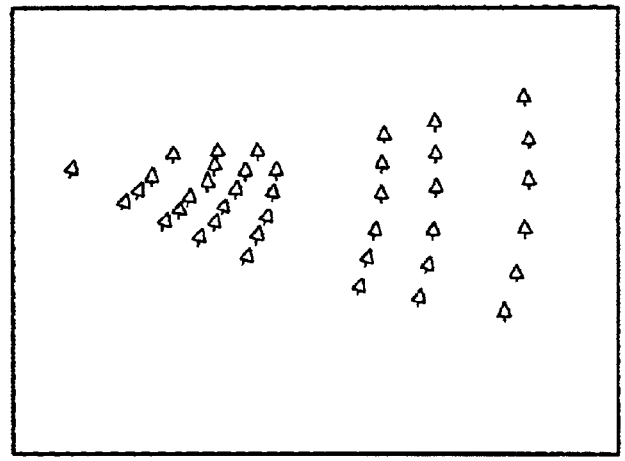
FIG. 5 illustrates normal gradients after erroneous data has been removed.

To eliminate the erroneous pixels, the boundary of the MR image from FIG. 1(*d*) can be eroded as shown in FIG. 4. Here a mask 220 is created from eroding the MR image to mask off the exterior boundary pixels and interior boundary pixels of holes in the MR image are illustrated. This process yields a cleaned up normal flow image shown in FIG. 5. Note that the MR is not illustrated in FIG. 5. The boundary mask cuts off the boundary pixels of the MR image and yields a cleaned up normal flow image. The function that implements the above algorithm can be referred to herein as approxNormalFlow (approximate normal flow) and takes a suitably normalized MH image as input to produce a NormalFlow angle image and a magnitude image as output. The "pixels" of the angle image are the angle of flow values from equation (1) and the pixels of the magnitude image are the magnitude values from equation (2). This new process is an improvement from a method that only removes motion pixels whose magnitude (equation (2) or (4)) are too large or small. That is, the threshold method is less reliable for MR images with sharp convexities or concavities since the gradient reading is unreliable there.

Figure 6A:
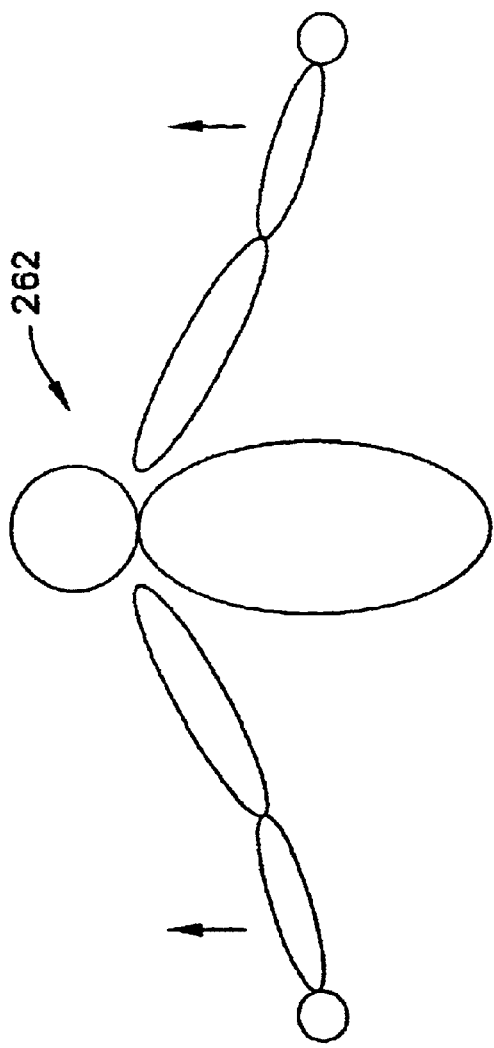
FIG. 6(*a*) illustrates a person raising both arms.
Figure 6B:
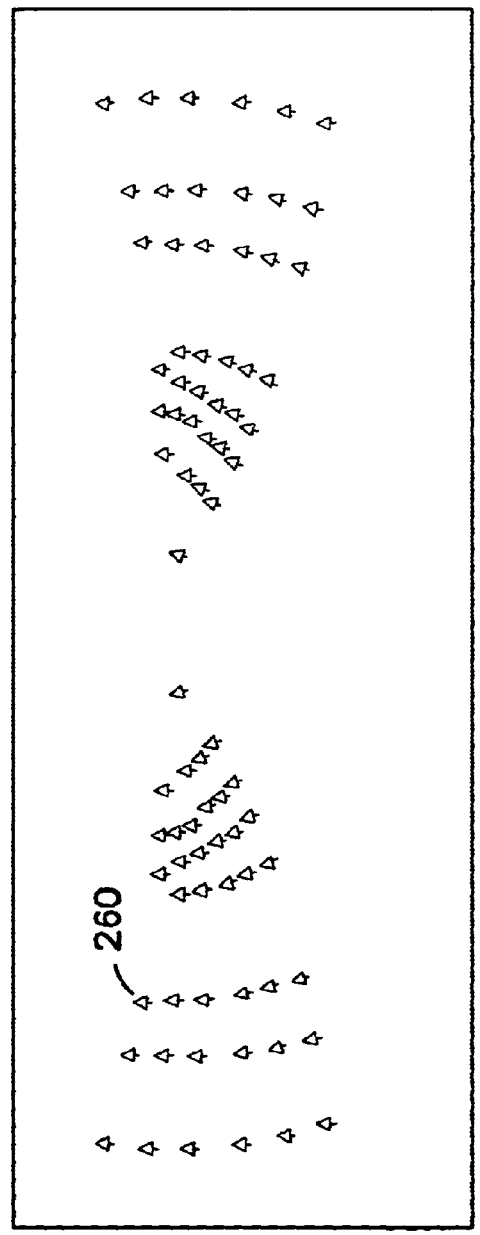
Figure 7:
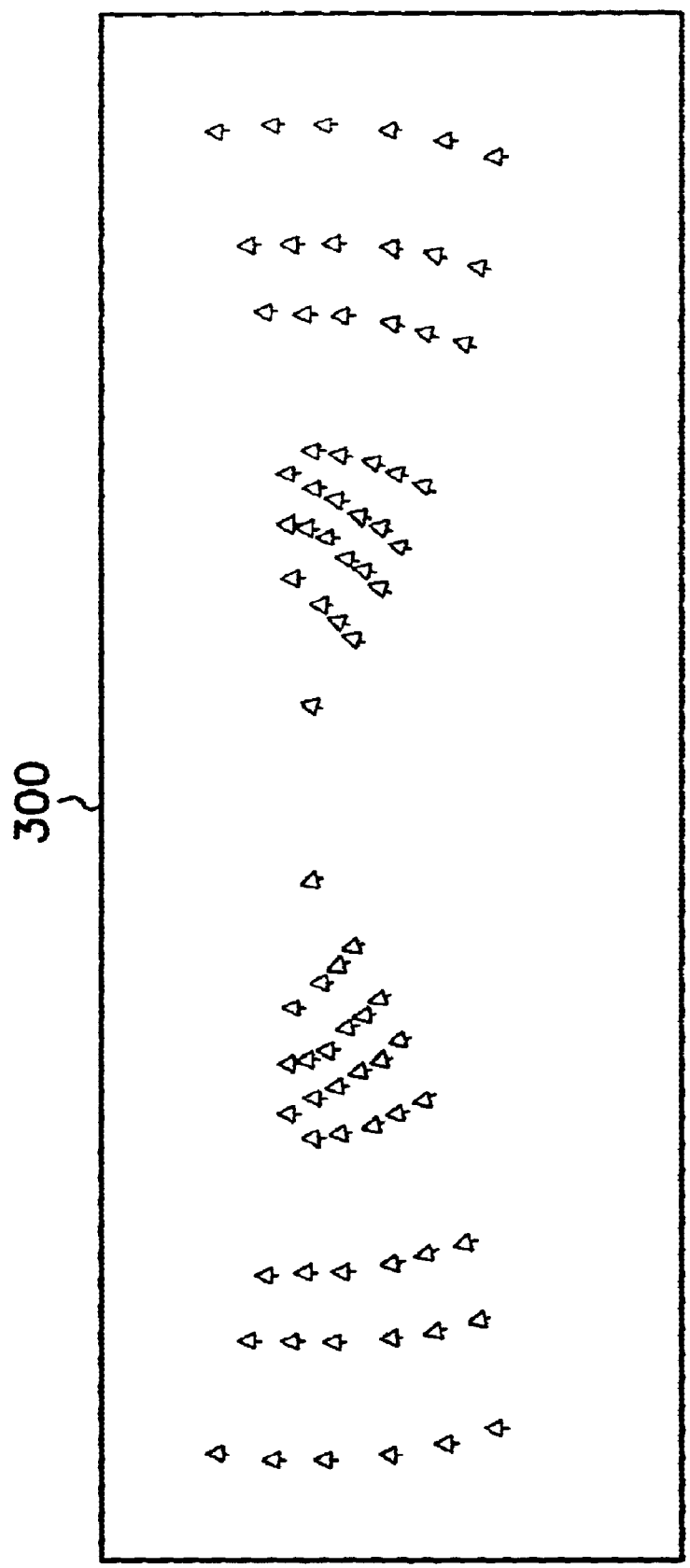
FIG. 7 is a histogram of FIG. 6(*b*)
Figure 8A:
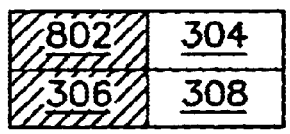
FIGS. 8(*a*)–(*h*) are different histograms of FIG. 6(*b*)
Figure 8B:
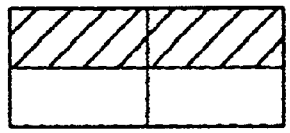
Figure 8C:
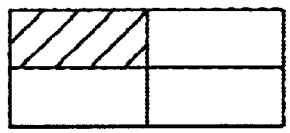
Figure 8D:
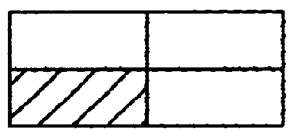
Figure 8E:
Figure 8F:
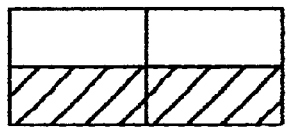
Figure 8G:
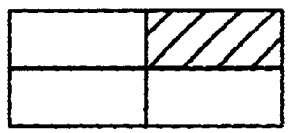
Figure 8H:

Referring to FIG. 6(*b*), a normal optical flow 260 that might result from a person 262 raising both arms (see FIG. 6(*a*)) is illustrated. One method of recognizing motion is illustrated in FIG. 7. Here a main histogram data-collecting region 300 is sized to the MR foreground object 262 and centered around a centroid of the object. This main histogram is then combined with sub-regions 302, 304, 306 and 308 in combinations as shown in FIGS. 8(*a*)–8(*h*) to form a single motion direction histogram data vector.

Figure 9:
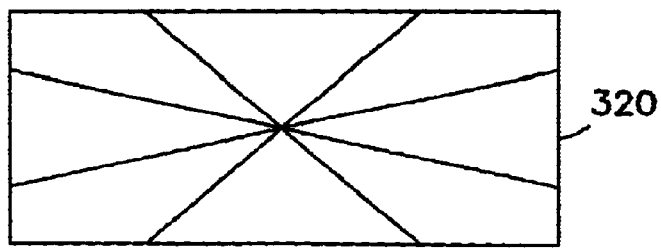
FIG. 9 is an alternate histogram of FIG. 6(*b*)
Figure 10A:
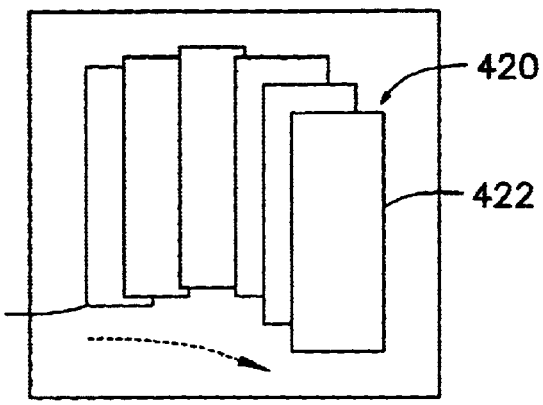
FIG. 10 illustrates an analysis of a block movements.
Figure 10B:
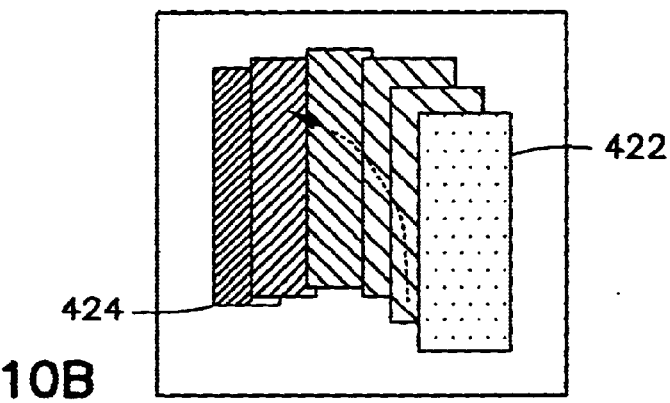
Figure 10C:
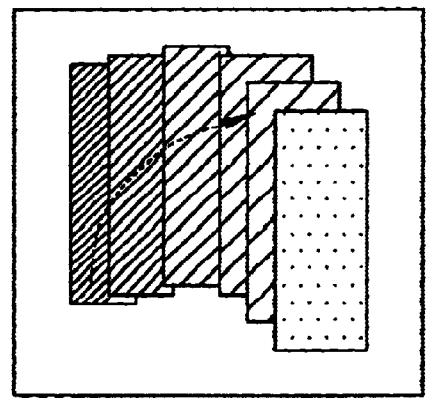
Figure 10D:
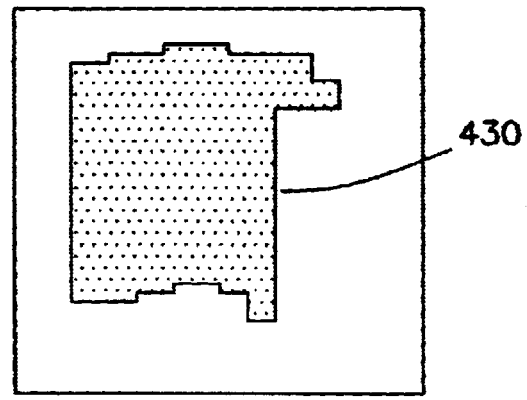

FIG. 9 illustrates an alternate method for collecting the motion direction into a histogram. The main motion direction data region window is sized and centered around the MR foreground object. Radial sub-regions 320 are used and more naturally catch waving type motions. As mentioned above for computational speed reasons, one method is not to code the normal optical flow directions directly in a 1D histogram as in equation (1), but to code the directions indirectly in a 2D histogram using equation (3).

An efficient histogram recognition architecture that naturally discounts noisy histogram bins by learning to accept any input in those bins (e.g. it learns noisy bins as "don't cares") is provided below. All input histograms H have their bins h normalized to form histogram Q after data collection via equation (5):

$$q_i = \frac{h_i}{\sum_k h_k}. \quad (5)$$

The (maximum wins) Chi Square renking is between Q and a model hisotgram V is:

$$\chi^2_{qv}(Q, V) = 1 - \sum \frac{(q_i - v_i)^2}{q_i + v_i}. \quad (6)$$

The minimum intersection measure between Q and V is:

$$\bigcap(Q, V) = \sum_i \min(q_i, v_i). \quad (7)$$

A histogram categorizer can be used in one embodiment to recognize and be formed as follows:

1) Inputs Q are presented with their complement C={q, q'}, where $q_i'=1-q_i$.
2) Choose the best minimum intersection choice V_j among stored histogram gesture models to select category.
3) In learning mode, if no category yet exists, copy C to V_1, the first gesture model. V_1 is then labeled as the gesture that it represents.
4) If there are some existing learned gesture categories in learning mode, and new input C chooses V_j (V "wins"), and that choice is correct, then category bin weights are learned as set forth below in equation (8).
5) If new input C chooses V_k and that choice is wrong, then Chi Square via equation (6) is used to choose the next closest category until:
    (a) a "winning" category is found with minimum intersection above a threshold lambda, else
    (b) a new category is formed and set equal to C (perfect match).
    If (a) happens, then learning takes place via equation (8).

When a correct "winning" category is found, the learning equation is:

$$v_i^{WIN}(t) = \alpha(\min(c_i, v_i^{WIN}(t-1))) + (1-\alpha)v_i^{WIN}(t-1) \quad (8)$$

In almost all cases, alpha in equation (8) can be set to 1.0—instant learning. The above described recognition architecture automatically builds a database of histogram gesture models. Equation (8) assures monotonic learning (weights can only get smaller) so that category weights are stable (do not oscillate). In learning, categories get monotonically larger so that spurious or noisy input bins eventually get wide enough to "accept" (and therefore ignore) that bin. Equation (6) and (7) assure that new learning for a category causes minimal change to the existing learned values. In performance mode, smaller, "tighter" categories win over larger categories that cover the same input.

The above described methods provide different techniques for generating a mask to isolate a global motion from images. The mask is used in combination with a motion history image. These methods, however, may not clearly identify multiple motions in the captured images. The following section describes methods for generating "sub-masks" for breaking up all the motion(s) into smaller components. Each sub-mask is then used in combination with a moti

Motion Segmentation

The present invention uses segmentation of a motion history image to detect multiple motions. The motion history image can be generated using any technique, and is not limited to the techniques described above. Multiple motions captured in an image can offset each other when evaluating a global motion image. For example, if a person moved their two arms in opposite directions, the overall global motion may show no movement, or possibly minimal movement. The present invention uses region analysis to determine if more than one movement was performed. The analysis also provides an indication of the direction of the detected movement(s).

In general, the present invention allows for the analysis of separate areas of a motion history image in order to determine motion within those areas. These motion areas are logically connected with movements of the segmented object of interest. The analysis looks for a recent portion of the image and 'looks' backward in time through the full image. As explained, this portion of the analysis can provide an accurate indication of sub-motions within the global motion. Looking backwards may not be enough, however, since multiple motions may not be readily identifiable using this single analysis. For example, if two objects, such as a persons hands, have moved toward each other to a touching position, the recent portions of the image would be the objects in contact with each other. Tracing backwards through time would diverge into two opposite directions. A global analysis could, therefore, result in an ambiguous analysis. The present invention also provides for a reverse analysis that starts at an older point(s) in the image and tracks the image history to a current location. This analysis provides two paths for the above example. That is, the analysis tracks both hands from earlier points in the image history to the current positions. By using both methods of analysis "current to past" and "past to current" in combination can provide a mask, or filter that can be used to separate out multiple movements. Embodiments of these analysis methods are described in greater detail below.

In one embodiment, a motion history image is scanned to find an image pixel with a value equal to the current silhouette. This value can be either a time stamp or a value. A current silhouette, therefore, could have a current time stamp, a maximum or a minimum value. In one embodiment, the pixels have an associated value that is reduced with the passage of time (current value is maximum). When a current pixel is identified the bounded region containing the pixel is filled, or flooded, such that the region has a new label. The flood operation can be provided using known graphical flood fill algorithms.

After the identified current region has been filled, the boundary of the current silhouette region is traversed and an analysis of pixels located outside the silhouette is performed. The analysis looks for recent, as yet unmarked, pixels in adjacent silhouette regions whose values are only slightly lower than the current region. When a recent unmarked silhouette region is found, a flood fill operation is performed to fill the bounded region containing the pixel. A unique value is used for each fill operation. It is noted that the image that is modified during the fill operations can be a separate temporary image that is a copy of the original motion history image. Further, the adjacent region is only filled if the value of the region is close to that of the last filled region. For example, assuming that a region having value 1.0 was just filled, adjacent regions having a value of 0.9 (where region increments are marked in 0.1 steps) would be filled, while adjacent regions having a value of 0.8 would not be filled. Once a fill commences, it fills all pixels whose values are equal to the value of the most recent filled adjacent pixel, or whose values are one step lower. This is then a downward flood fill.

The fill operations are continued until a region is located that has a minimum value. This minimum value can be the oldest image contained in the image file, or can be some threshold value that has been pre-determined. For each minimum value region found while performing the down filling operation, the pixel location where the region was first found is recorded. That is, the 'origination' location(s) of the motion history is identified. The unique fill values should be incremented sequentially for each down fill operation performed.

The above down fill operation can provide enough information to identify separate, unitary movements. Separating multiple co-joined movements, however, requires additional analysis. "Up fill" operations can performed following the "down fill" operations. The up fill operations start at one of the minimum value regions identified during the down fill process.

The up fill operation fills a region with a unique identifier and then scans the boundary of that region to locate adjacent pixels/regions that are one step newer than the filled region. Each adjacent "upward" region is flooded with the same unique identifier until the most recent region is reached. The unique up and down fill values for each fill operation should be arranged such that any up fill value plus any down fill value for a region yields a unique number. For example, if there are at most 10 possible regions filled, then down fills could be labeled 0, 1, . . . , 9; and up fills could be labeled 100, 110, . . . , 190 such that any up+down number is itself unique.

After one up fill operation has been completed, the operation is repeated for each of the minimum value regions identified during the down fill process. Again, the up fill image is a copy of the motion history image. As such, the down fill and up fill images can be used in combination. In one embodiment, the images are combined in a pixel-wise manner to provide a composite image, or mask. It is noted that there are many ways to accomplish joining up fill and down fill results. For example, the images can be kept separate or logically combined.

Referring to FIGS. 10–13, motion examples are provided to further explain the present invention. FIGS. 10(*a*)–(*d*)

illustrate the movement of a single "block" 420. The block is a generic representation of an object, including a person. Here the image is scanned until a current silhouette region 422 is found, FIG. 10(a). That region is marked. The boundary of that region is then evaluated and adjacent regions are filled downwards, FIG. 10(b). The location(s) of a first minimum pixel found in all minimum (oldest) silhouette regions 424 is recorded. After the down fill operation, an up fill operation is performed from the minimum silhouette region(s), FIG. 10(c). This is done for all current silhouette regions. The resultant images from the down fill operation and each up fill operation are combined, uniquely labeling each resulting connected region to get a mask 430 of segmented motion regions, FIG. 10(d). This is done until no more unmarked current silhouette regions are found. Again, it may not be necessary to perform the up fill operations where only a single motion is contained in the motion history image.

Figure 11:
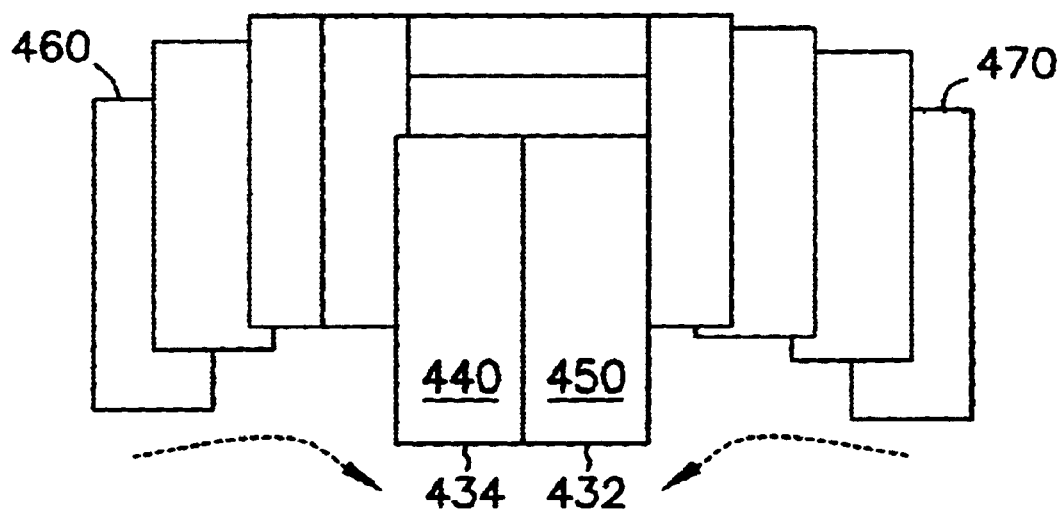
FIG. 11 illustrates an analysis of two block's movements.

FIG. 11 illustrates the movement of a two "blocks" 432 and 434. Here the two blocks move toward each other. Performing a down fill operation, the most recent regions 440 and 450 are located toward the center of the image and older adjacent regions 460 and 470 are down filled in both the left and right directions. It will be appreciated by those skilled in the art, after studying the present disclosure that the two blocks motions are obscured. As such, up-fill operations should be performed to separate the individual movements. As explained above, the up fill operations start at regions identified with the lowest value (oldest regions) 460 and 470. Thus, a first up fill operation is started at region 460 and progresses toward the most recent region 440. A second up fill operation is started at region 470 and progresses toward the most recent region 450. These two up fill operations combined with the down fill operation allow for the detection of the two independent motions.

Figure 12A:
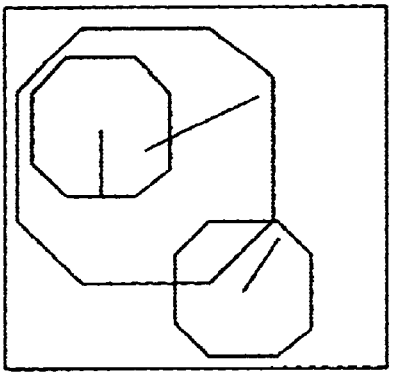
FIG. 12 illustrates an analysis of a person's movements.
Figure 12B:
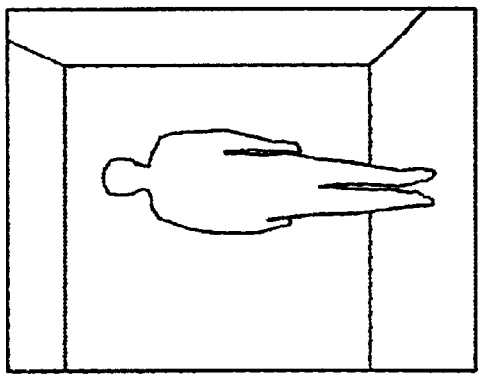
Figure 12C:
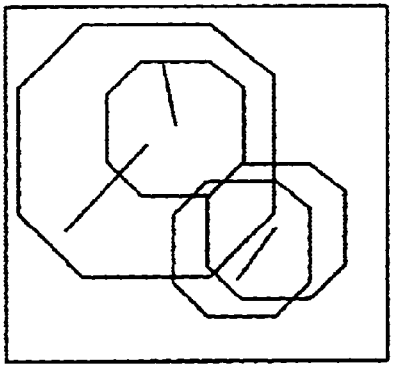
Figure 12D:
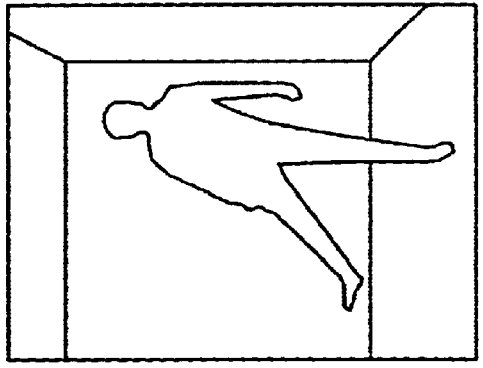
Figure 12E:
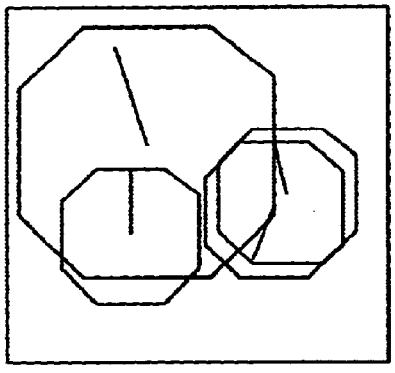
Figure 12F:
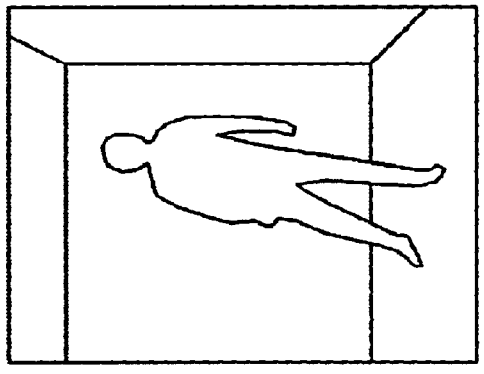
Figure 12G:
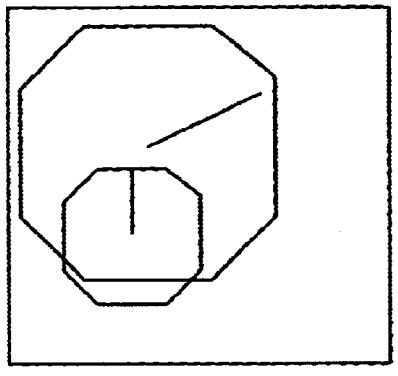
Figure 12H:
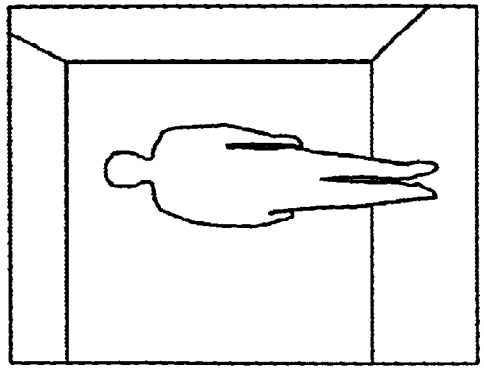
Figure 13I:
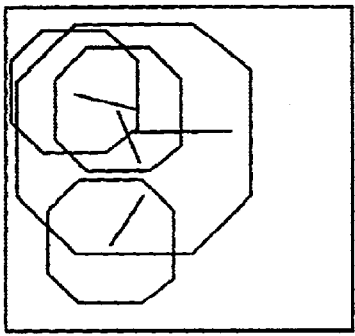
FIG. 13 illustrates another analysis of a person's movements.
Figure 13J:
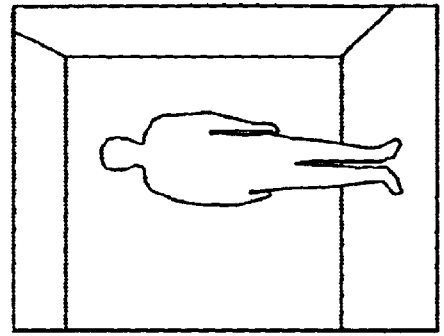
Figure 13G:
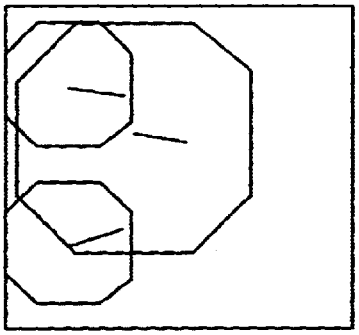
Figure 13H:
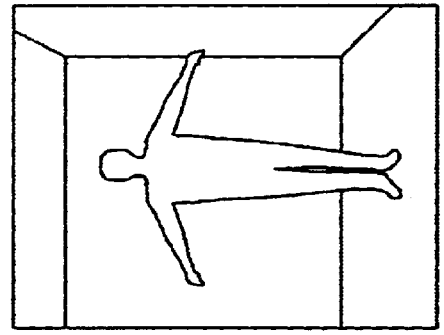
Figure 13E:
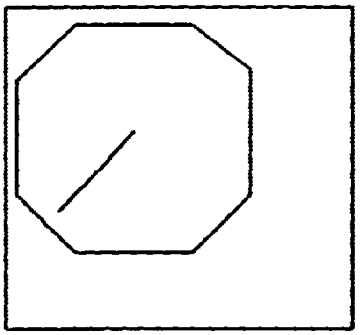
Figure 13F:
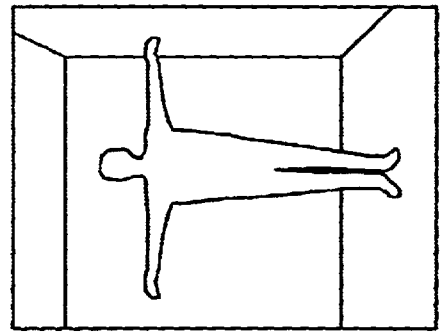
Figure 13C:
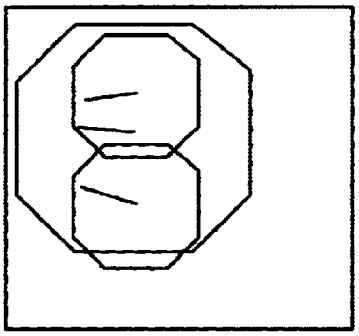
Figure 13D:
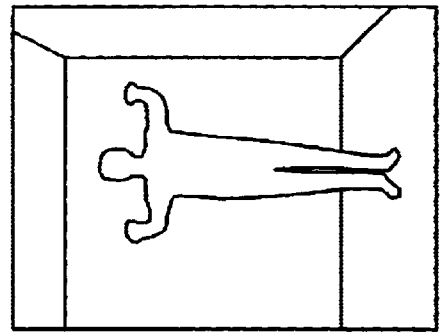
Figure 13A:
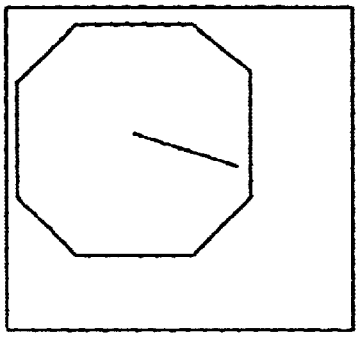
Figure 13B:
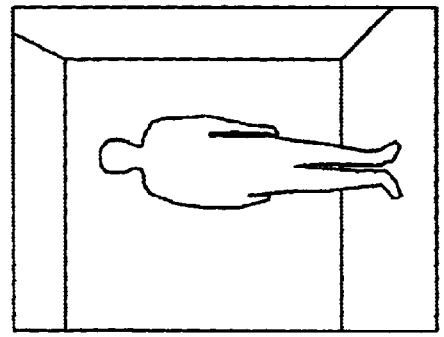

FIGS. 12(a)–(h) illustrate a photo sequence and a motion history image with direction indicators (superimposed hexagonal image) of a person performing a kicking motion. In the first photo, FIG. 12(b), the person's hands have just been brought down as indicated by the large global motion arrow in the corresponding motion history image, FIG. 12(a). The small segmentation arrow (small hexagonal image) indicates more recent motion and illustrates the leftward lean of the body. In the next photo, FIG. 12(d), the left leg lean and right leg motion are detected, FIG. 12(c). In the third photo, FIGS. 12(f) and MH 12(e), the left hand motion and right leg are indicated. In FIGS. 12(g) and (h), the downward leg motion and rightward lean of the body are detected. In another example, FIGS. 13(a)–(j) illustrate segmented motion and recognized pose for a person lifting their arms into a "T" position and then dropping the arms back down. The large superimposed arrow indicates global motion over a few seconds, and the smaller superimposed arrows show segmented motion as long as the corresponding silhouette region moved less than 0.2 seconds ago.

Figure 14:
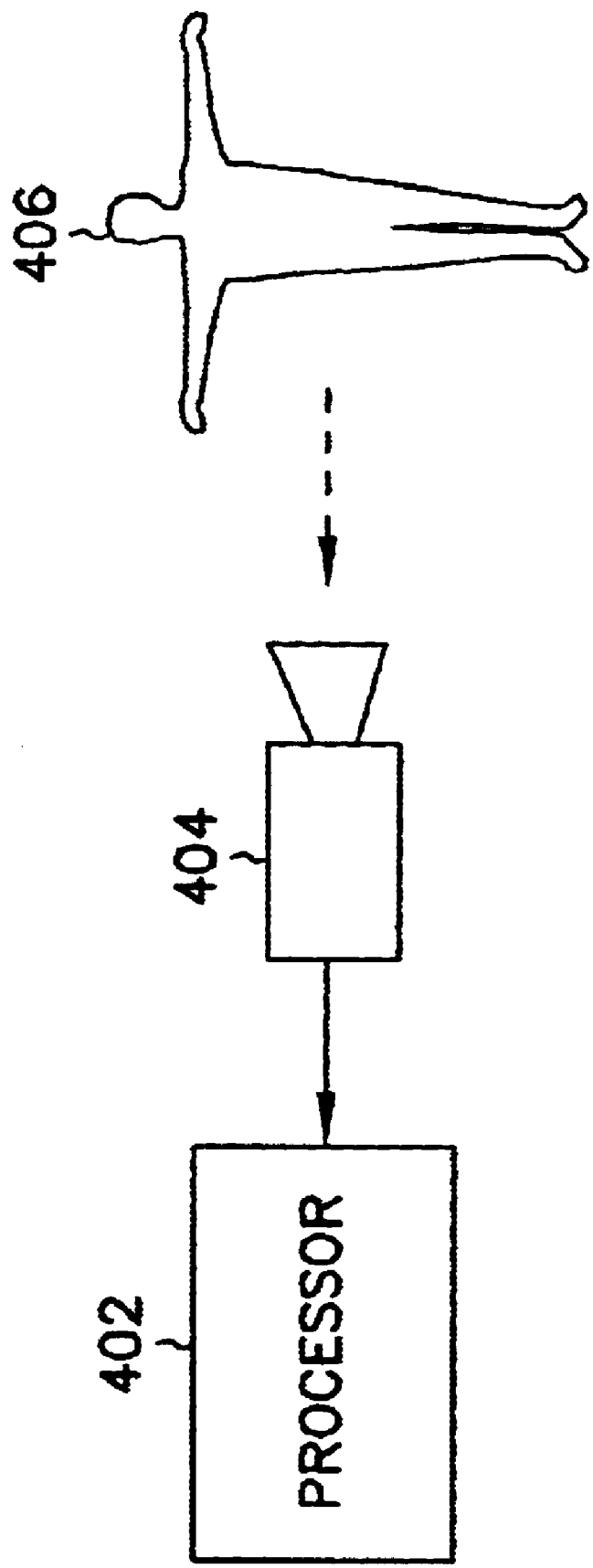
FIG. 14 is an illustration of one embodiment of a system of the present invention.

FIG. 14 illustrates a simplified system 400 implementing the present invention. The system 400 includes a processor 402 that is coupled to at least one camera 404. The camera obtains images of an object 406, as explained above. The system can be any type of machine/person interface system, such as surveillance, entertainment or safety systems. Processor 402 can be any known type of processor including a personal computer. The processor can be instructed to perform the methods described herein for detecting motion of the object. These instructions can be provided on a computer readable medium, such as magnetic or optical diskettes.

Conclusion

A system and method have been described which allow for the detection and segmentation of motion. The system and method use a motion history image generated by observing an object over a given period of time. The motion history image contains numerous regions captured at different time intervals. The method has been described in which the most recent region(s) are located and adjacent older regions are sequentially labeled with a unique identifier via a down fill operation. This down fill operation can identify a single motion region contained within the motion history image. If the motion history image contains co-joined movements, separate up fill operations can be performed to help separate these movements. Each up fill operation begins at a set of oldest or lowest value regions and progresses toward the most recent region. The down fill and up fill operations can be combined to provide an image mask(s) to separate the multiple motions from the motion history image.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A method of detecting motion comprising:

obtaining a plurality of images of an object over a predetermined period of time;

generating a motion region image of the object from the plurality of images;

tracking regions of the motion region image from a current region to an older region; and identifying movement based on the tracking regions of the motion region image, wherein generating the motion region image comprises:
isolating the object in the plurality of images from a background to form a plurality of silhouettes;

overlapping the plurality of silhouettes; and setting all pixels of the overlapped silhouettes to an equal value.

2. The method of claim 1 wherein tracking regions of the motion region image comprises:

labeling contents of each region of the motion region image with a unique identifier, wherein the unique identifier is selected based upon an age of the region being labeled.

3. The method of claim 2 wherein the movement is identified by a placement of the unique identifiers.

4. The method of claim 1 further comprising tracking regions of the motion region image from the older region to the current region.

5. The method of claim 4 further comprising generating a motion region image mask that can be used in combination with the plurality of images to identify regions containing the detected motion.

6. A computer readable medium comprising instructions to instruct a processor to perform the method of claim 1.

7. A method of detecting motion comprising:

obtaining a plurality of images of an object using a camera, the plurality of images are obtained over a predetermined sliding window of time;

generating a motion region image of the object from the plurality of images by isolating the object in the plurality of images from a background;

performing a down fill operation on the motion region image, wherein the down fill operation tracks regions of the motion region image from a current region to an older region, and labels each region of the motion region image with a first unique identifier, wherein the first unique identifier is selected based upon an age of the region being labeled;

performing at least one up fill operation on the motion region image, wherein the up fill operation tracks regions of the motion region image from the older region to the current region, and labels contents of each region of the motion region image with a second unique identifier; and identifying movement based on the down fill operation and the at least one up fill operation.

8. The method of claim 7 further comprising:

combining results of the down fill operation and the at least one up fill operation to generate a motion region image mask that can be used in combination with the plurality of images to identify regions containing the detected motion.

9. The method of claim 7 wherein the down fill operation comprises:

labeling pixels of a first region with a first identifier;

scanning a boundary of the first region to identify pixels in a second region, located outside of the boundary of the first region, captured one time period prior to the pixels of the first region; and labeling pixels of the second region with a second identifier.

10. The method of claim 7 wherein the object is a person.

11. The method of claim 7 further comprising:

combining results of the down fill operation and the at least one up fill operation to generate multiple motion region image masks that can be individually used in combination with the plurality of images to identify multiple regions containing motion.

12. A computer readable medium comprising instructions to instruct a processor to perform the method of claim 7.

* * * * *